United States Patent [19]

Kiencke

[11] 3,824,385

[45] July 16, 1974

[54] DIGITAL DIVIDER CIRCUIT

[75] Inventor: Uwe Kiencke, Moglingen, Germany

[73] Assignee: Robert Bosch GmbH, Stuttgart, Germany

[22] Filed: Oct. 10, 1973

[21] Appl. No.: 405,143

[30] Foreign Application Priority Data

Oct. 28, 1972 Germany........................... 2253006

[52] U.S. Cl............. 235/150.3, 235/92 FQ, 328/39

[51] Int. Cl.............................................. G06f 7/52

[58] Field of Search..... 235/92 FQ, 150.3; 307/210, 307/220, 225; 328/39, 41, 48

[56] References Cited

UNITED STATES PATENTS 3,716,794 2/1973 Teggatz et al. ....................... 328/39

*Primary Examiner*—Charles E. Atkinson
*Assistant Examiner*—R. Stephen Dildine, Jr.
*Attorney, Agent, or Firm*—William R. Wordevard Flynn & Frishauf

[57] ABSTRACT

The frequency of an input pulse train serves as the dividend and operates a first counter in continuously repeated cycles. The divisor is stored as a binary number in a divisor register and, by means of an adder, the divisor and successive integral multiples thereof are successively registered in a summing register at intervals determined by the operation of a comparator which compares the more significant digits of the summing register with all of the lower integral multiple of the divisor, the adder or the summing register is advanced to present the next higher multiple. The succession of output pulses of the comparator provide a pulse train the frequency of which is the quotient. The divisor may be generated by a pulse train and periodically registered, either as a number proportional to the period of the pulse train or a number proportional to the frequency of the pulse train. The divisor register, adder and summing register have additional places for less significant bits in excess of the number of places in the first counter, enabling great reduction in the maximum rounding error.

16 Claims, 7 Drawing Figures

DIGITAL DIVIDER CIRCUIT

This invention relates to a digital division circuit suitable for measuring speed ratios in motor vehicle equipment where the speeds are measured by the count of pulses in periods of predetermined duration.

Digital speed information can be provided for processing either as binary numbers or as pulse train frequencies. One division circuit is known in which the dividend is supplied as a pulse train frequency and the divisor as a binary number. The number value of the divisor is repeatedly transferred to a backwards counting circuit operating at the rate determined by the dividend pulse train. The number of times the backwards counter counts down to zero in a predetermined period of time is supplied as the result of the division. This result, i.e., the quotient, appears likewise in the form of a pulse train frequency.

The known division circuit just described has the critical deficiency that when the divisor has large numerical values, very low output frequencies are provided as the quotient. Such low output frequencies can then be processed in subsequent computation or other data processing circuits only with substantial delay times. The delay period required for producing the final value of the result in such a digital computer circuit is always the greater, the lower the input pulse train frequency is.

It is accordingly an object of the present invention to provide a division circuit which provides, as its output, pulse train frequencies that are as high as possible.

SUBJECT MATTER OF THE PRESENT INVENTION:

Briefly, the dividend is provided as a first input pulse train frequency supplied to a first counter the output of which is compared to a series of sums constituting the successive integral multiples of the divisor, in such a way that comparison is first made with the divisor until the comparator finds a match, then the divisor is added to itself and when the comparator next finds a match, the divisor is again added to the previous sum, and so on. The divisor may be supplied as a binary number in various ways, but preferably it is generated by a second counter the bit output of which is loaded at predetermined fixed intervals into a divisor register, immediately after which the second counter is reset.

In a particularly advantageous form of the invention the divisor register, the second counter, the repetitive adder and its summing register, as well as any intermediate loading gates, have more digit places than the comparator and the first counter, the comparison being made with the bits of the summing register at the more significant bit end. The additional less significant bits, although they do not participate directly in the comparison, continually contribute to the more significant bits of the next sum, thus avoiding the sometimes massive rounding errors that have been observed in prior division circuits used in automotive electronics.

Every time the comparator detects a match it provides an output pulse that not only serves to command another addition of the divisor for the summing register, but also serves as a pulse of the output pulse train, the frequency of which is the quotient.

By the present invention the frequency of the output pulses is just as great as if the divisor were kept small by having its pulses come at relatively low frequency, but the accuracy and freedom from rounding errors is just as great as if the divisor pulses come in large number, which in the previous systems always resulted in very low output frequencies.

The first counter does not have to be reset, because the divident frequency simply drives it to its maximum content and it necessarily goes back to the beginning thereafter. Of course when it starts over, the summing register has also overflowed, so the process can continue.

Within each counting cycle of the first (dividend) counter, a number of quotient pulses are provided by the comparator, thus providing output frequencies substantially greater than the previously known division circuits.

As previously mentioned, division circuits heretofore used have suffered from large rounding errors for low values of the divisor. If in the extreme case the divisor is provided as a one-place binary number, the rounding error is 50 percent. With the provision of additional places in less significant bit positions in the divisor register, the adder and the summing register, the divisor can be given a fine structure without slowing down the frequency of the output pulses, while keeping the rounding errors at negligible levels. In the case of four additional places, the maximum rounding error is still 3 percent. It can be further reduced by increasing the number of additional places in the divisor register, the adder and the summing register.

The invention will be described by way of example with reference to the accompanying drawings, wherein.

Figure 1:
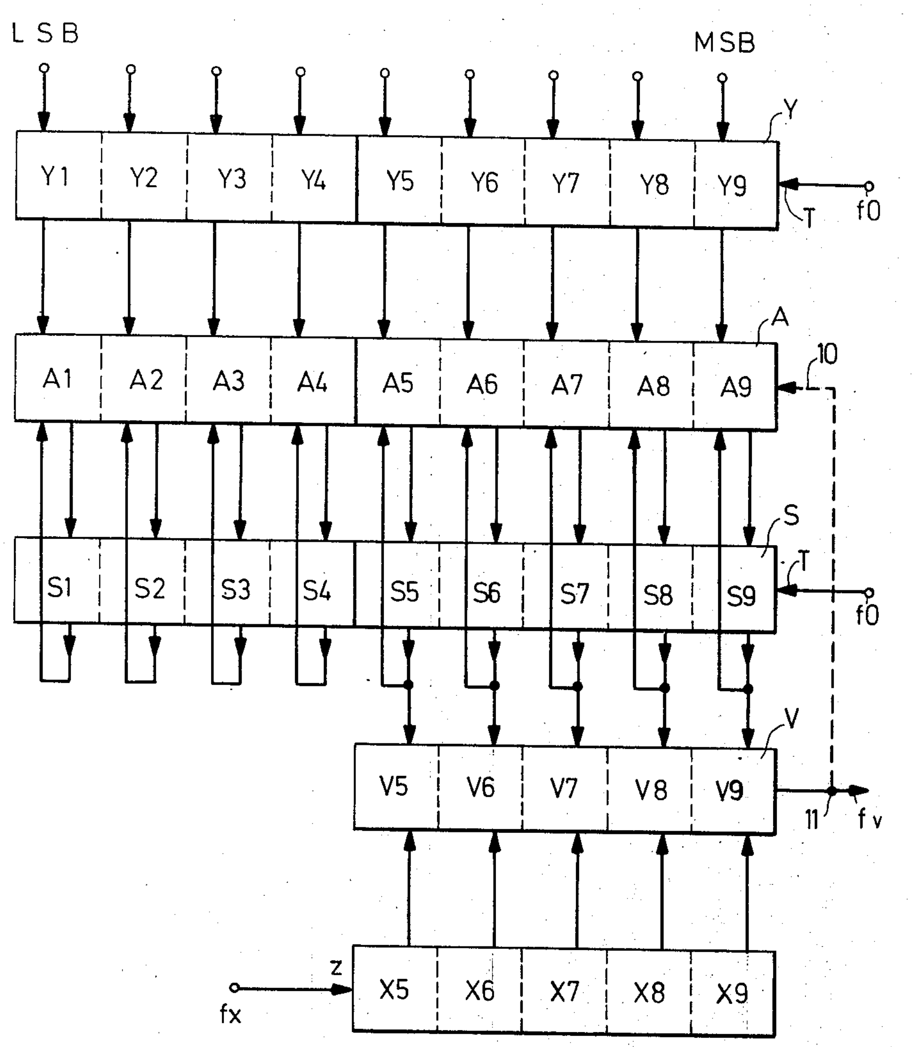
FIG. 1 is a block diagram of an illustrative embodiment of the invention.

In FIG. 1 a binary number adder, designated A, is shown containing individual stages A1 to A9 each of which serves to perform addition at a single binary digit (bit) place of a binary number. Each stage A1 to A9 has two inputs and one output, indicated by appropriately directed arrows. The stage A1 corresponds to the least significant bit (LSB), whereas the stage A9 corresponds to the most significant bit (MSB). The adder A also has a supplementary input 10 for enabling the addition operation.

The outputs of the individual stages A1 to A9 of the adder A are connected to the inputs of corresponding individual stages S1 to S9 of a summing register S. One set of inputs of the stages A1 to A9 of the adder A is connected to the output of a divisor register Y and the other set of inputs of the adder A is connected to the outputs of the summing register S. The divisor register Y likewise has individual stages Y1 to Y9. The inputs of the divisor register Y are not further indicated. They can be connected to a pulse frequency to binary number converter of the form shown in FIG. 4, further described below. As shown in FIG. 1, the registers Y and S each have a timing input to which the timing frequency fO can be supplied.

A first counter X shown at the bottom of FIG. 1 comprises 5 stages X to X5, which are to be compared with the 5 most significant bits of the summing register S, the comparison being done by the binary number comparator V which comprises 5 stages V5 to V9. The binary counter X is driven at its counting input v by a pulse train of a first input frequency fx which is proportional to the dividend. The quotient frequency fv is produced at the output 11 of the comparator V, one pulse being produced whenever a match occurs between the two inputs to each of the comparator stages. A dashed line from the comparator output 11 to the supplementary input 10 of the adder A indicates possible connections, now to be further discussed.

Figure 2:
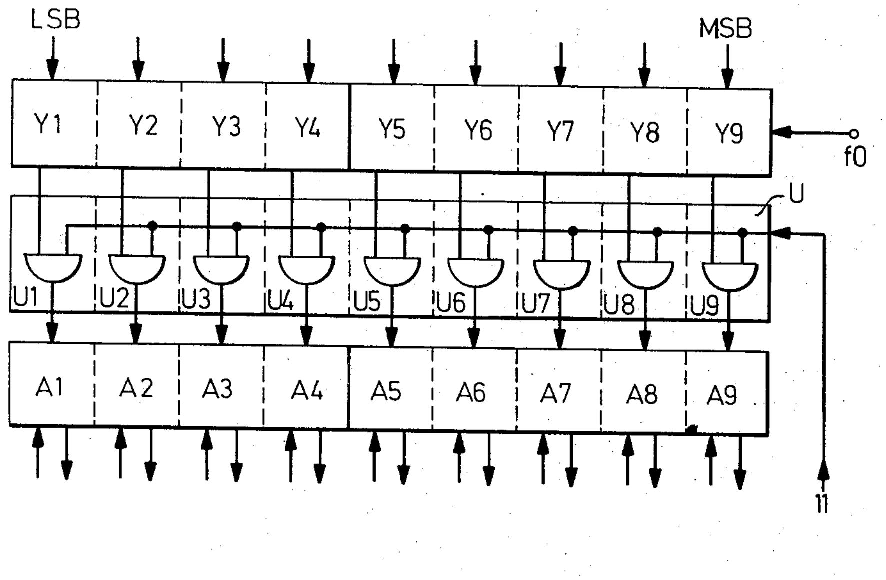
FIG. 2 and FIG. 3 are block diagrams of loading gate circuits for use in the embodiment shown in FIG. 1.
Figure 3:
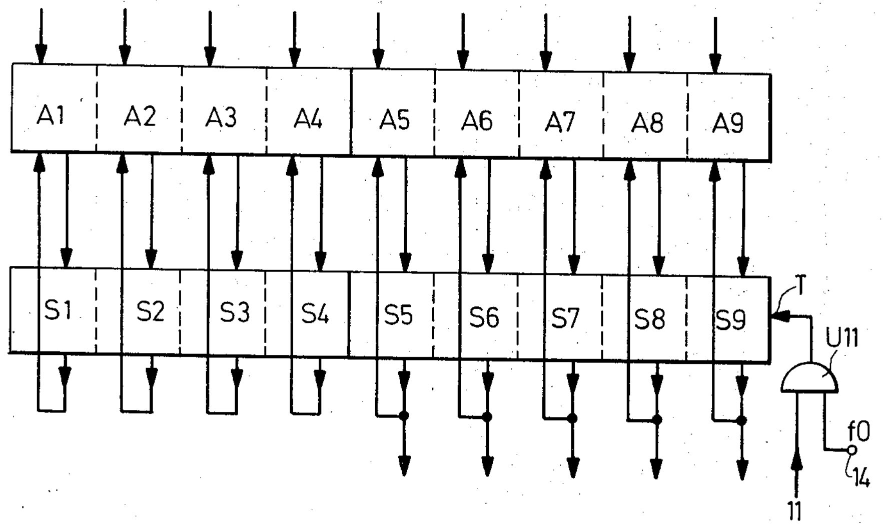

In the practical embodiment of the division circuit shown in FIG. 1, the supplementary input 10 of the adder A is not strictly an input to the adder, but rather a connection to a loading gate which is provided for controlling the transfer of a new sum to the summing register S in response to an output signal of the comparator V. Two circuits for this purpose are shown in FIGS. 2 and 3 respectively. In the circuit of FIG. 2 a loading gate U is provided between the divisor register Y of the first set of inputs of the adder A. The loading gate U consists of individual stages U1 to U9, each of which contain an AND-gate having one input to the output of the corresponding stage of the divisor register and another input connected to the output 11 of the comparator V. The output of the individual AND-gates U1 to U9 are connected to the corresponding adder inputs A1 to A9.

In the circuit of FIG. 3 a substantially simpler loading gate U11 is used composed of a single AND-gate. This AND-gate U11 has its output connected to the timing input T of the summing register S. One of its inputs is connected to the output 11 of the comparator V and the other input of this AND-gate U11 is connected to a terminal 14 to which a basic pulse frequency fO is applied.

Figure 6:
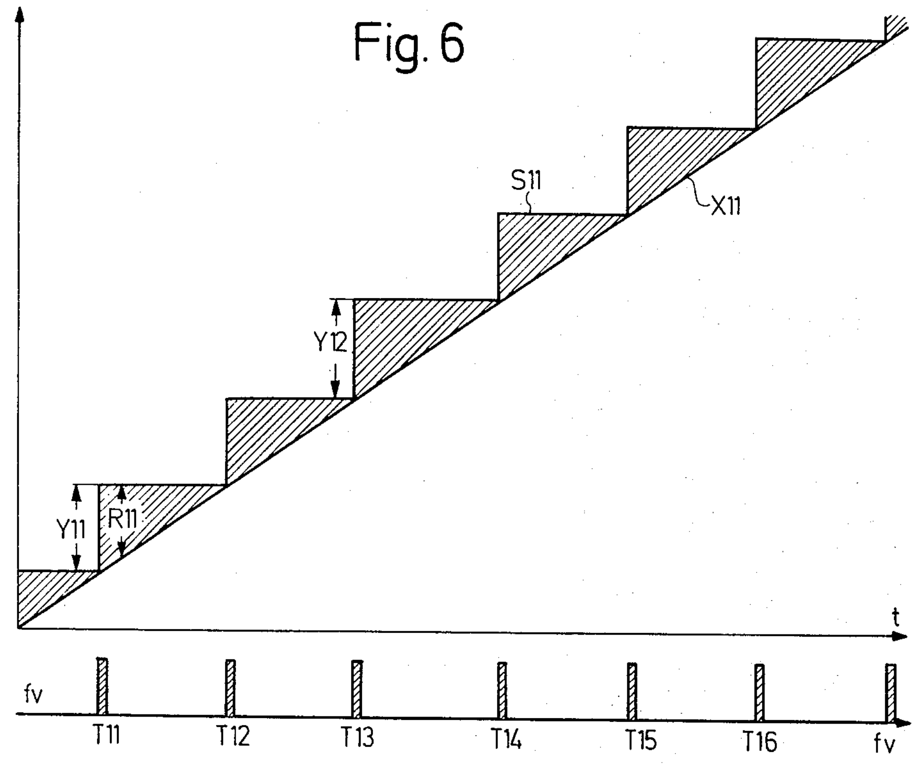
FIG. 6 is a graph for explaining the manner of operation of the embodiment shown in FIG. 1.

The graph appearing in FIG. 6 illustrates the manner of operation of the embodiment of the invention above described. The diagonal line X11 indicates the time course of the count in the first counter X. This straight line is more strictly to be regarded as a step curve, but the step magnitude is so small that on the scale chosen for this illustration it does not come to visibility. A step curve S11 shows the progress with time of the count registered in the summing register S. The height of the steps is designated in one place as Y11 and in another as Y12. The dimension R11 which is the difference S11 minus X11 for the particular moment of time, is the vertical distance between the step curve S11 from the diagonal line X11. The pulses T11, T12, etc. at the bottom of the graph are the output pulses of the comparator V occurring at the frequency *fv*.

It should be mentioned at this point that the components of the circuit of FIG. 1 can be commercially available integrated circuit units. The registers Y and S are known under the type designation Ser. No. 49,702, the adder A under the type designation Ser. No 7,483, the comparator V under the type designation Ser. No. 7,485 and the counter X under the type designation Ser. No. 74,161 or under the type designation Ser. No. 7,493. By the use of such integrated circuit components, the circuit of FIG. 1 can be very simple and readily understandable.

OPERATION AS SHOWN IN FIG. 6

At the beginning of the division operation, the divisor, hereafter referred to as *y*, is stored in the divisor register Y. Since no addition operation has yet been enabled by means of the supplementary input 10, the binary number zero (all bits 0) is still stored in the summing register S. If now the count in the first counter X is zero, which happens of course every so often, anyhow, the comparator V finds a match on the two input numbers and provides an L signal which enables an addition operation by virtue of being communicated to the supplementary input 10 of the adder A.

By an L signal is understood that the output 11 is at positive potential. When where is no match, the comparator V produces an O signal which, again as defined for this illustration, means that its output 11 is at negative potential.

At the output of the adder A there now appears the sum of the two binary numbers appearing at the registers Y and S respectively, i.e. the value of the divisor y. This value is then loaded into the summing register S, so that the comparator V again finds that the two numbers respectively appearing at its two inputs are unequal and provides an O signal at its output. This O signal prevents a further loading of the adder output signal to the summing register S, as described further below in connection with FIGS. 2 and 3. The first counter X now upwardly counts the pulses of the input frequency fx. At an instant T11 (see FIG. 6), the count in the first counter X reaches the value stored in the summing register S, i.e., the value *y*. The comparator V again provides an L signal at its output which remains for the duration of one counting pulse of the frequency *fx*. As the result of this L signal, stored values in the two registers S and Y are again added to each other and the sum is loaded in the summing register S, so that at its outputs the number 2*y* appears. The operation just described repeats periodically. The comparator C always produces an L signal when at the moments T11, T12 . . . . the count in the first counter X has the successive values *y*, 2*y*, 3*y* . . . . These L impulses are collectively designated *fv* in FIG. 6. Their frequency is the higher, the smaller the value of the divisor *y*. For a constant input frequency *fx*, the pulse train frequency of the output pulses *fv* are inversely proportional to the number of counting steps necessary to count off the value of the divisor *y*. The output frequency *fv* is therefore also inversely proportional to the divisor, as is necessary for a division circuit. The apparatus constituted with the circuit of FIG. 1, therefore, makes it possible to form the quotient of the frequency *fx* and the binary number stored in the divisor register Y.

The highest output frequency *fv* is produced for the smallest possible values of the divisor Y. The accuracy of this highest output frequency *fv* is determined by the number of the supplementary places Y1 to Y4. The divisor register Y, the adder A and the summing register S, as may be seen in FIG. 1, have a larger number of places or stages than does the comparator V, exceeding the number of places that the comparator has by the number of remainder places (in the illustrated case, four remainder places). The stage Y5 of the divisor register Y corresponds to the lowest place which is compared with a digit of the first counter X, in fact the place which is compared with the lowest digit of the counter X. Since the divisor y is added several times to the number stored in the summing register S in a single counting cycle of the first counter X, the remainder places Y1 to Y4 also influence the division result. Such a case is represented in FIG. 6 at the moment of time T13. At this point a greater step height *y*12 is produced, greater by 1 bit than the normal step height *y*11. The binary number stored in the remainder places $Y_1$ to $Y_4$ thus operates at the moment T13 in the form of a rounding up of the binary number stored in the places Y5 to Y9, or of the number stored in the places S5 to S9.

A sufficiently large number of remainder places Y1 to Y4 is chosen, so that the desired precision is obtained even with the smallest value of the divisor Y within the expected range.

There remains to be described in connection with FIG. 1 the loading of the content of the adder A into the summing register S. Two possible circuit variations are shown in FIGS. 2 and 3 respectively. In the circuit of FIG. 2 the individual AND-gates U1 to U9 are blocked so long as the comparator V provides an O signal at its output 11, i.e., so long as no match of the two numbers compared is present. During this time, therefore, only the output signal of the summing register S is present at an input of the adder A. AT the same time the output signal of the adder A is present at the input of the summing register S.

The stored content of the summing register S can thus not change, because with the leading edge of each clock pulse of the basic pulse frequency fO only the persisting steady value of the output number of the adder A can be put into the summing register S. As soon as the comparator V provides an L signal, however, the output signal y of the divisor register Y is transferred through the loading gate Y to a set of inputs of the adder A. The adder A then forms the sum of the number stored in the summing register S at the last previous clock pulse and the divisor y. This sum is transferred to the summing register as soon as the leading edge of the next clock pulse of the basic pulse frequency fO appears at the timing input T of the summing register S.

When that happens, the comparator again finds inequality of its two input numbers and its output signal jumps back to O. Further clock pulses fO no longer produce any change of the output signal of the summing register, until the next match is found as the result of the continuing of the count in the first counter X.

In the circuit of FIG. 3 the clock pulses of the basic pulse frequency fO, by the leading edge of which new numbers can be carried over into the summing register S, are not applied directly to the summing register S, but rather through the AND-gate U11 the output of which is connected to the timing input T of the summing register S. In contrast to the circuit of FIG. 2, the outputs of the adder A always form a binary number equal to the sum of the two input numbers. This binary sum number can be loaded into the summing register S, however, only when the latter is supplied with a timing pulse through the AND-gate U11. This is the case only when at one input of the AND-gate U11 an L signal is provided by the comparator C through its output 11 and, at the same time, the leading edge of a clock pulse fO arrives at the other input of the AND-gate U11.

Both of the circuits shown in FIGS. 2 and 3 thus assure that upon the arrival of the first clock pulse fO after equality of the two input numbers in the comparator V has been found, the number stored in the summing register S will be raised by the value of the divisor *y*. The clock pulses must of course have a frequency higher than the highest frequency that the frequency *fx* may have. The circuit cost of the circuit of FIG. 3 is somewhat smaller than for the circuit of FIG. 2. It is necessary to take account, however, of the fact that every AND-gate introduces a small delay period. For this reason the individual storage flip-flops of the summing register S in the circuit of FIG. 3 are switched at a time which follows the switching of the corresponding flipflops of the divisor register Y by the period of the gate delay. This can in some circumstances lead to disturbance of the operation, if gates with relatively large delay periods are used. If such disturbances are to be feared, the circuit of FIG. 2 provides the advantage that in that circuit the timing inputs of all registers are operated directly by the basic pulse frequency fO.

Figure 4:
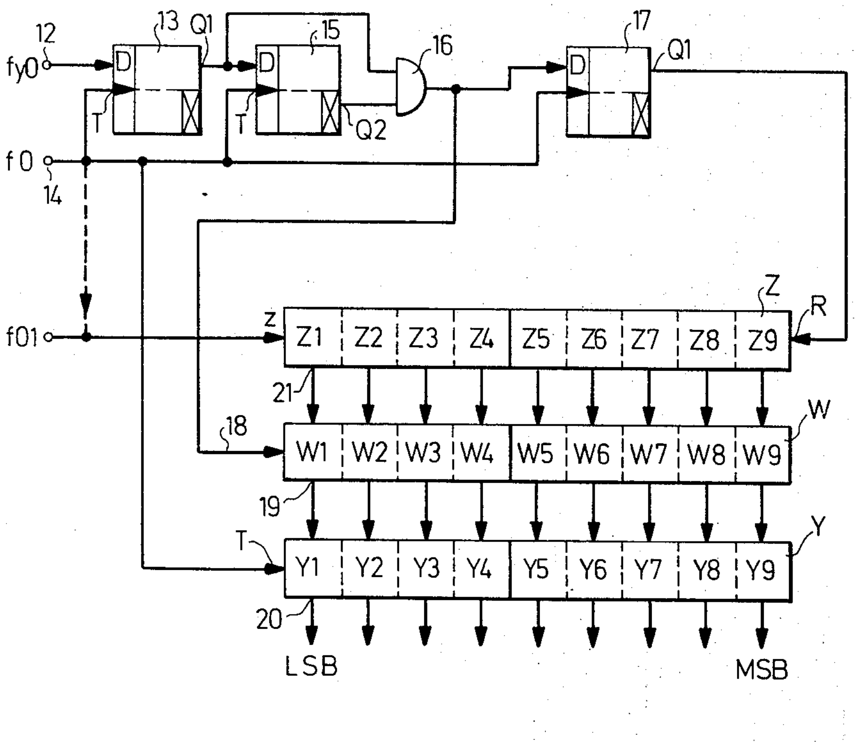
FIG. 4 is a block diagram of a pulse frequency to digital number converter.

The circuit just described with reference to FIGS. 1, 2 and 3 is well suited to form the quotient of two digital measuring signals, where the divisor is supplied as a binary number and the dividend as an impulse train frequency. When a division circuit is used in control or a regulating circuit, however, it often occurs that the divisor is also supplied as an impulse train frequency, because in this fashion the signal transmission from the measuring device to the computation circuit is simplified. A circuit suited to convert a pulse train frequency *fy* into a binary number inversely proportional to the impulse train frequency *fy*, i.e., directly proportional to the repetition period, is shown in FIG. 4. Such a circuit is particularly well suited for rotation speed measurements. The principal component groups in the circuit of FIG. 4 are a second counter Z and a second loading gate W. Both of these component groups are composed of individual stages, respectively Z1 to Z9 and W1 to W9. The second loading gate W is interposed between the outputs of the second counter Z and the input of the divisor register Y, the same register Y that is shown in FIG. 1. Pulses at a timing frequency fO1, which in some cases can be identical with the basic pulse frequency fO, as indicated by the broken line connecting the two pulse sources in FIG. 4, are supplied to the counting input *z* of a second counter Z.

The second input pulse train frequency *fy* is applied to an input terminal 12 of the circuit of FIG. 4 which is connected to the input D of a first countdown flipflop 13. This is a so-called "D" flipflop. All of the flipflops referred to in the following description are provided with complementary outputs Q1 and Q2, which means in this case that the second output Q2 supplies a O signal so long as an L signal is provided at the first output Q1. The first output Q1 of the first countdown flipflop 13 is supplied to the D input of a second countdown flipflop 15. The outputs Q1 of the first countdown flipflop 13 and Q2 of the second countdown flipflop 15 are respectively supplied to the two inputs of an AND-gate 16, the output of which is supplied to the D input of a third countdown flipflop 17. The output of the third countdown flipflop 17 is supplied to a reset input R of the second counter Z. The output of the AND-gate 16 is also supplied to a load control input 18 of the second loading gate W. The timing inputs T of the three countdown flipflops 13,15 and 17, which are all so-called "D" flipflops, are all connected to the terminal 14 to which the basic pulse frequency *fO* is supplied.

Figure 5:
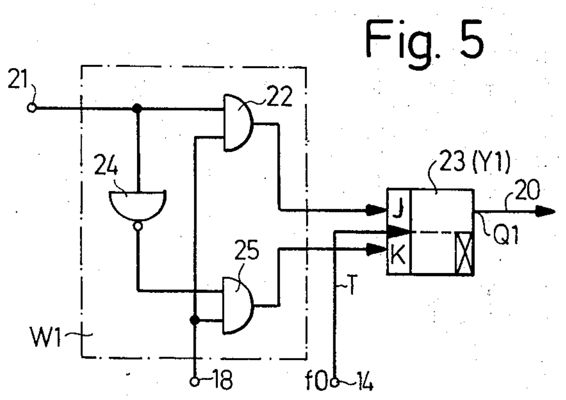
FIG. 5 is a circuit diagram by way of a detail showing of part of FIG. 4.

The outputs of the respective first stages Z1, W1 and Y1 of the second counter Z, the second loading gate W and the divisor register Y are identified by the reference numerals 21, 19 and 20. A circuit diagram of the stages W1 and Y1 is shown in FIG. 5.

The stage W1 of the second loading gate W contains an AND-gate 22 having one input connected to the output 18 of the AND-gate 16 and another input connected to the output of the corresponding cell of the second counter Z. The output of the AND-gate 22 is supplied to the J input of a so-called "JK" flipflop 23, which constitutes the stage Y1 of the divisor register Y. The terminal 21 of FIG. 5, which corresponds to the connection 21 of FIG. 4, is also connected with the input of an inverter stage 24, the output of which is supplied to a first input of an AND-gate 25 which has its second input connected to the terminal 18 which, as shown by the connection 18 of FIG. 4, is connected to the output of the AND-gate 16. The output of the AND-gate 25, which is the second AND-gate of the cell or stage W1, is connected to the K input of the "JK" flipflop 23. The timing input T of the "JK" flipflop 23 is connected, as already described in connection with FIG. 4, to the terminal 14 to which the basic pulse frequency fO is supplied. The first output Q1 of the "JK" flipflop 23 constitutes what has been designated as the output of the stage Y1. The remaining stages of the second loading gate W and of the divisor register Y are constituted in the same way as the respective stages illustrated in FIG. 5.

Figure 7:
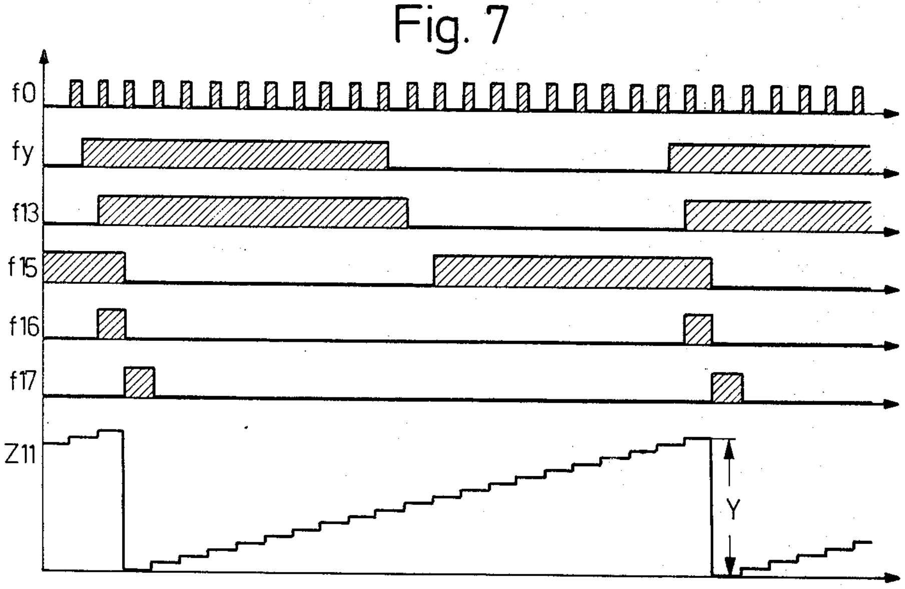
FIG. 7 is a timing diagram for explaining the manner of operation of the pulse frequency to binary number converter shown in FIG. 4.

FIG. 7 is a timing diagram showing the basic pulse frequency *fO* and a sequence of its clock pulses on the top stripe of the graph. The output pulses of the stages 13, 15, 16 and 17 are shown at the levels designated *f*13, *f*15, *f*16 and *f*17 respectively in FIG. 7. In addition, the magnitude of the number contained in the second counter Z for the times shown in this timing diagram are shown in the bottom portion of the graph by the step curve identified with the reference numeral Z11.

The signals supplied to the terminal 12, i.e., pulses of the second input pulse train frequency *fy*, are transferred at the beginning of each clock pulse *fO* of the first output Q1 of the first countdown flipflop 13 and one clock pulse *fO* later, these signals are then passed on to the output of the second countdown flipflop 15, with a reversal, however, because the output of the second countdown flipflop 15 that is used is its second output Q2. The sequence of the pulses *fy*, the pulses at the first output of the first countdown flipflop 13 and the pulses at the second output of the second countdown flipflop 15, with their delays and polarities, are indicated respectively by the heavy lines *fy*, *f*13 and *f*15 in FIG. 7.

The AND-gate 16 provides an L signal f16 only when L signals are supplied to both of its inputs. After the beginning of an *fy* pulse, which is the case from the time of the leading edge of the second subsequent clock pulse until the leading edge of the second subsequent clock pulse *fO*, as shown in the pulse train *f*16 of FIG. 7, the output pulse of the third countdown flipflop 17 follows directly the output pulse of the AND-gate 16 and likewise has the length of one period of the basic pulse frequency *fO*.

So long as the AND-gate 16 supplies an L signal, the content of the second counter Z is transferred over to the divisor register Y. With the arrival of the leading edge of the pulse *f*17, the second counter Z is reset over its reset input R. Since the counting frequency *f*01 of the second counter Z (which may be, for example, the basic pulse frequency *fO*) remains constant with time, the number *y* reached by the time the pulse *f*16 is present, is proportional to the length of the period of the second input pulse train frequency *fy*, and this number is used as the divisor. With the circuit of FIG. 4 it is thus possible to produce a binary number which is based on a pulse train frequency and proportional to its repetition period. It is also possible to provide for the divisor register Y differently constituted pulse frequency to binary number converter interposed ahead of the divisor register Y, a converter which will provide a binary number at its output which, for example, is proportional to the second pulse train frequency *fy* itself, rather than to the period of the pulse train. Such a circuit involves somewhat more complication and expense. Thus, in such a circuit, a second counter could count the pulses of the second input pulse train of variable frequency *fy* in the same way the first counter counts the pulses of the first input pulse train *fx*, except that at fixed intervals, for example whenever a predetermined number of clock pulses have been counted, the second counter has its content transferred by a loading gate and the divisor register Y and the second counter is then immediately reset. This requires an additional set of timing pulses or an additional counter for deriving them from the clock pulses, in addition the necessity of a flipflop circuit to provide the sequence of reading and resetting the second counter at the fixed intervals.

When a frequency representing the speed of a shaft is divided by a frequency representing the speed of another shaft, the quotient is the ratio of the speeds. If a frequency representing the speed of a shaft is divided by a quantity inversely proportional to the frequency of another shaft, as for example by the quantity proportional to the period of rotation of the other shaft, the quotient formed by the division circuit then equals the product of the speeds of the two shafts. The design of the particular control or regulating circuit determines whether such a ratio or such a product is to be continuously computed. For the accuracy of the division circuit without sacrifice of the quickness of response which is connected with the provision of frequencies that are above a certain minimum tolerable frequency, it is important to have remainder places in the divider register and in the summing register in excess of the digit positions that are to be compared in the comparator, because the divisor must in the digits being compared be sufficiently small compared to the maximum number storable in the first counter, so that a sufficient number of pulses of the quotient frequency will be provided in the counting cycle of the divident frequency for the highest expected value of the divisor. For the lowest expected value of the divisor, there must be enough remainder places so that the rounding errors will not pile up and will be kept to a very low value over the counting cycle of the dividend frequency. These criteria can be satisfied by a proper selection of the proportionality factors involved in the pulse transmitters providing the pulse trains representing the speeds of the various shafts, that is, by the number of poles, gearing up or down, or the like.

Some details of the operation of transferring the content of the second counter Z to the divisor register Y remains to be explained with reference to FIG. 5. The switching condition of the "JK" flipflop 23 can change during the presence of the pulse f16, there being two possibilities to be distinguished:

1. The corresponding stage Z1 of the second counter Z provides an L signal. An L signal then appears at the output of the AND-gate 22 for the duration of the pulse *f*16 and, at the same time, an O signal appears at the output of the AND-gate 25. Upon the arrival of the next clock pulse *fO*, an L signal, i.e., the output signal of the second counter Z, will be transferred to the output 20 of the divisor register.

2. The counter stage Z1 provides an O signal. During the pulse f16 the AND-gate 22 in this case provides an O signal, and the AND-gate 25 provides an L signal. The bit content of the stage Z1, namely the O signal, is then transferred to the output 20 of the divisor register at the beginning of the next subsequent clock pulse fO.

The described manner of operation of "D" flipflops and of "JK" flipflops are known. There is here mentioned, as bibliography therefor, "Digitale Elektronik in der Messtechnik und Datenverarbeitung," by Dokter-Steinhauer, 3rd Edition 1972, Vol. 1, pp. 163–165.

As an example for the utilization of the division circuit here described, the measurement of speeds of rotation in a motor vehicle should be mentioned. Conventionally used speed measuring devices for internal combustion engines or vehicle wheels comprise gear wheels with ferromagnetic teeth. The number of teeth is in such cases limited to about 50 to about 100. The output frequencies of such speed indicators lie between a few Hz and a few kHz, according to the particular speeds to be measured. These frequencies are too low for digital signal processing.

On the other hand, the manufacturing tolerances of such speed indicators are normally quite small, so that it is possible to make the gears of the speed indicator with an angular accuracy of 0.1 percent. The circuit described in FIGS. 1 and 4 provides a higher output frequency that has the same high degree of accuracy.

As a particular example a motor speed indicator with 100 teeth can be considered. At a low speed of e.g. 600 revolutions per minute, the gear wheel makes 10 revolutions in 1 second and the speed indicator puts out a pulse train with a frequency of 1 kHz. The corresponding repetition period is 1 millisecond. If now the counter frequency *f*01 is set at 1 MHz, the second counter Z counts 1,000 pulses during one repetition period. At a high motor speed of 6,000 r.p.m., the output frequency of the speed indicator is 10 kHz and the second counter Z counts 100 pulses during one repetition period of the pulse train *f*01. These count accumulations proportional to the repetition period of an input pulse train are successively loaded into the divisor register Y. For the case of a simple tachometer, a fixed frequency can be used for the first input frequency *fx*, since it is still necessary to form a value inversely proportional to the repetition period. It is convenient to choose for *fx* the same frequency of 1MHz, as chosen for the counting frequency *f*01. The output frequency *fv* of the comparator V is then 100 kHz for the case of the low motor speed of 600 r.p.m., whereas at the high motor speed of 6,000 r.p.m. an output frequency of 1 MHz results. The requirement for obtaining such high output frequencies without loss of accuracy is that the proper number of remainder places Y1 to Y4 are used. For the smallest periods to be measured, only the positions Y1 to Y5 should contribute to the count, with one-bit steps being counted out at 1 MHz.

Since the minimum pulse count per period amounts to 100 pulses, a maximum rounding error of 1 percent can occur. The maximum output frequency *fv* of 1 MHz is subject to this error. The error of the minimum output frequency of 100 kHz, on the other hand, amounts to at most 0.1 percent.

The division circuit here described also makes possible, by precisely counting out the period of a speed indicator output signal followed by the formation of an inverted value, an output frequency proportional to the speed of rotation that can be made to appear and vary within the range from 100 kHz to 1 MHz, which is well suited for processing in digital computer circuits. In the event that a different frequency-to-binary-number converter should be used, other division operations can be accomplished meeting the high requirements of accuracy which the present invention was designed to meet. Even when the divisor falls to low values, no great rounding errors occur, because remainder places can be provided in the registers, gates and adders in great number and to any desired extent.

For example, one or a few of the most significant bit places of the divisor register Y shown in FIG. 1, for example the stages Y9 and Y8, could be omitted, with the most significant bit in the divisor being placed in Y7 or lower, to assure that there will always be at least four *fv* pulses per counting cycle of the counter X in the worst possible case (largest divisor). The stages A8 and A9 of the adder A are then supplied only by bits from the summing register S and by "carry" bits from the immediately preceding stages.

Although the invention has been described with respect to particular embodiments, it is to be understood that modifications and variations are possible within the inventive concept.

I claim:

1. A digital division circuit suitable for speed measurements in motor vehicles, comprising:

first register means (Y) for storing the divisor as a binary number;

binary adder means (A) having a first set of inputs connected to the outputs of said first register means (Y);

second register means (S) having its inputs connected to the outputs of said adder means (A) and its outputs connected to a second set of inputs of said adder means (A);

first counting means (X) responsive to an input pulse train the frequency (fx) of which constitutes the dividend quantity;

comparator means (v) for comparing the outputs of said first counting means (X) and the outputs of said second register means (S) and arranged to enable the advance of said second register means (S) to register the output of said adder means (A) only when a match of the outputs of said first counting means (X) and of said second register means (S) is found, and arranged also to provide an output pulse at each such match to form the quotient frequency (*fv*).

2. A division circuit as defined in claim 1 in which said first register means (Y), said adder means (A) and said second register means (S) each have a number of additional places (Y1 to Y4, A1 to A4 and S1 to S4) in excess of the number of places possessed by said comparator (V), which additional places are assigned to the less significant bits of said divisor binary number.

3. A division circuit as defined in claim 1 in which said adder means (A) is provided with a supplementary input (10) arranged for enabling the addition function of said adder means (A), and in which said supplementary input (10) is connected with the output (11) of said comparator (V).

4. A division circuit as defined in claim 3 in which a first loading gate (U) is provided having individual stages (U1 to U9) interposed between the corresponding stages (Y1 to Y9) of said first register means (Y) and said first set of inputs of said adder means (A).

5. A division circuit as defined in claim 4 in which the individual stages (U1 to U9) of said first loading gate (U) each consist of an AND-gate having a first input connected to the corresponding stage (Y1 to Y9), having a second input connected to the output (11) of said comparator (V) and having its output connected to the corresponding input of said adder means (A).

6. A division circuit as defined in claim 3 in which said supplementary input (10) of said adder means (A) comprises an AND-gate (U11) having a first input connected to the output (11) of said comparator (C), its output connected to a timing pulse input (T) of said second register means (S) and a second input connected to connector means for applying a basic pulse frequency (fO).

7. A division circuit as defined in claim 1 in which said divisor is supplied to said first register means (Y) as a binary number by a second counting means (Z) responsive to a second input pulse train the frequency (*fy*) of which constitutes the divisor quantity, said second counting means being provided with means for loading the bit content of said second counting means at regular intervals into said first register means (Y) and immediately thereafter resetting said second counting means (Z).

8. A division circuit as defined in claim 7 in which a second loading gate (W) is provided for loading the bit content of said second counting means (Z) into said first register means (Y).

9. A division circuit as defined in claim 8 in which logic circuit means are provided responsive to said second input pulse train (*fy*) for activating the load control input (18) of said second loading gate (W), said logic circuit comprising:

- a sequence of two countdown flipflop (13, 15) responsive to pulses of said second input pulse train, and
- an AND-gate responsive to outputs of each of said flipflops of respectively opposite polarity and having its output connected to said loading control input (18) of said second loading gate (W).

10. A division circuit as defined in claim 9 in which a third countdown flipflop (17) is provided with its input connected to the output of said AND-gate (16) of said logic circuit means and with an output (Q1) connected with a reset input (R) of said second counting means (Z).

11. A division circuit as defined in claim 8 in which the individual stages (Y1 to Y9) of said first register means (Y) are constituted as JK flipflop means (23) and in which each stage (W1 to W9) of said second loading gate (w) comprises two AND-gates (22, 25) having their respective outputs connected to the two inputs (JK) of said JK flipflop means (23) of the corresponding stage of said first register means.

12. A division circuit as defined in claim 11 in which said AND-gates (22, 25) of said first register means each have an input (18) functioning as said loading control input connected to the output of said AND-gate (16) of said logic circuit means and in which the second input of a first AND-gate (22) of said two AND-gates is connected directly to the output (21) of the corresponding stage (Z1 . . .) of said second counting stage (Z) and the second input of said second AND-gate (25) of said two AND-gates is connected over an inverting stage (24) to said output (21) of said corresponding stage (Z1 . . .) of said second counting means (Z).

13. A method of measuring the ratio or product of the speeds of two rotating members with one speed specified as dividend and the other as divisor, comprising the steps of:

- generating pulse trains of frequencies respectively proportioned to the speeds of said rotating members;
- driving a first binary counter of a first predetermined number of places with the dividend frequency;
- driving a second binary counter of a second predetermined number of places, larger than said first number of places, in a manner controlled by the divisor frequency, the factor of proportionality of said divisor frequency to the speed of the corresponding rotating member being chosen with respect to the corresponding proportionality factor of said dividend frequency and to the difference between said second and said first number of places, so that for the lowest quotient frequency in the expected range at least a predetermined minimum number of quotient pulses will be provided in each cycle of said first binary counter;
- storing the content of said second binary counter at intervals chosen so the content of said counter will have the desired proportional relation to the speed of one of said members, and resetting said secondary binary counter when said storage has been effected;
- adding the said stored content first to zero and then to the sum of the previous addition at intervals determined as set forth hereinbelow and registering the result of the addition in a register having said second number of places;
- comparing the content of said first binary counter with the *n* most significant binary digits in said register, *n* being equal to said first number of places, and producing a quotient frequency pulse whenever a match is thus found, and
- using the quotient frequency pulses to cause the last stored content of said second binary counter to be added to the content of said register and to advance said register to contain the new sum.

14. A method as defined in claim 13 in which said second number of places exceeds said first number of places by at least 4, whereby the maximum rounding error does not exceed 3 percent.

15. A method as defined in claim 13 in which said second binary counter is driven at a predetermined constant pulse rate and its content is stored and the counter reset at intervals corresponding to the period of a pulse train proportional to the period of rotation of said rotating members.

16. A method as defined in claim 13 in which said second binary counter is driven at a pulse rate proportional to the speed of rotation of one of said rotating members and in which the content of said second binary counter is stored and said second binary counter is immediately thereafter reset at predetermined fixed intervals.

* * * * *